United States Patent
Eliáš et al.

(10) Patent No.: US 9,860,326 B2
(45) Date of Patent: Jan. 2, 2018

(54) DUPLEX SERVICES RESIDING IN A MESSAGING BUS

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 356 days.

(21) Appl. No.: 14/192,735

(22) Filed: Feb. 27, 2014

(65) Prior Publication Data

US 2015/0244511 A1    Aug. 27, 2015

(51) Int. Cl.
*H04L 29/08*    (2006.01)
*H04L 29/06*    (2006.01)
*G06F 15/16*    (2006.01)

(52) U.S. Cl.
CPC .......... *H04L 67/16* (2013.01); *H04L 65/1069* (2013.01)

(58) Field of Classification Search
CPC ....... H04L 5/14; H04L 67/1091; H04L 67/16; H04L 67/14; H04L 65/1069
USPC ........... 709/204, 217–219, 227–229; 700/20; 370/276
See application file for complete search history.

(56) References Cited

U.S. PATENT DOCUMENTS

| | | | | |
|---|---|---|---|---|
| 6,898,467 | B1 * | 5/2005 | Smith .................... | G05B 15/02 700/20 |
| 7,643,817 | B2 * | 1/2010 | Klug ................... | H04L 63/0442 455/411 |
| 8,224,975 | B1 * | 7/2012 | Liu ..................... | H04L 65/1069 709/217 |
| 8,433,746 | B2 | 4/2013 | Vecera et al. | |
| 8,484,401 | B2 | 7/2013 | Bezdicek et al. | |
| 8,489,693 | B2 * | 7/2013 | Eibach .................... | G06F 9/546 709/203 |
| 8,489,733 | B2 | 7/2013 | Vecera et al. | |
| 2006/0087999 | A1 * | 4/2006 | Gustave .............. | H04L 63/0853 370/328 |
| 2007/0253435 | A1 * | 11/2007 | Keller .................... | H04L 67/14 370/401 |

(Continued)

OTHER PUBLICATIONS

Wu Chou, Jun. 15, 2007, Avaya Labs, Web Services and SOA for Communication—Part I.*

(Continued)

*Primary Examiner* — David Lazaro
*Assistant Examiner* — Zi Ye
(74) *Attorney, Agent, or Firm* — Haynes and Boone, LLP (57) ABSTRACT

An example method of integrating a plurality of heterogeneous peer-to-peer communication participants includes retrieving from a first input queue coupled to a duplex service a first message. The first message includes a message identifier and is from a sender. The method also includes applying a first operation on the first message, determining a first output of the first message based on the first operation, and sending the first output of the first message to a target. The method further includes retrieving from a second input queue coupled to the duplex service a second message. The second message includes the message identifier and is from a target. The method also includes applying a second operation on the second message, determining a second output of the second message based on the second operation, and sending the second output of the second message to the sender.

18 Claims, 6 Drawing Sheets

(56) References Cited

U.S. PATENT DOCUMENTS

| | | | |
|---|---|---|---|
| 2011/0032847 A1* | 2/2011 | Allen | H04L 67/14 370/276 |
| 2011/0258262 A1 | 10/2011 | Bezdicek et al. | |
| 2012/0143634 A1 | 6/2012 | Beyda et al. | |
| 2013/0297973 A1 | 11/2013 | Hyland et al. | |

OTHER PUBLICATIONS

Wu Chou, Jun. 15, 2007, Avaya Labs, Web Services and SPA for Communication—Part II.*

Brian Hulse et al., What's New in WebSphere Enterprise Service Bus V6.2, Part 2:Service gateway patterns, retrieved on Apr. 8, 2014 from http://www.ibm.com/developerworks/websphere/library/techarticles/0906_jackson2/0906_jackson2.html, pages 1-12.

JaxView Provides Flexible Deployment Options, retrieved Apr. 8, 2014 from http://www.managedmethods.com/content/21.html, pp. 1-4, Copyright © 2005-2010 Managed Methods.

Chapter 25: Designing Service Applications; retrieved on Apr. 8, 2014 from http://msdn.microsoft.com/en-us/library/ee658114.aspx, pp. 1-13.

* cited by examiner

DUPLEX SERVICES RESIDING IN A MESSAGING BUS

BACKGROUND

The present disclosure generally relates to a messaging bus, and more particularly to one or more duplex services residing in a duplex message bus.

Service Oriented Architecture (SOA) is a popular architectural paradigm for the development of software applications. For example, Web services provide the SOA to other applications via industry standard networks, interfaces, and protocols. The SOA is based on loosely-coupled and standards-based architectures. It is an approach to distributed computing that allows networked software resources to be leveraged. The SOA enables enterprises to integrate services, handle business events, and automate business processes more efficiently. For example, an SOA links information technology (IT) resources, data, services, and applications.

The SOA can include an enterprise service bus (ESB). An ESB is an underlying infrastructure for the SOA and implements the abstract design concept of the SOA. An ESB is a distributed middleware system for integrating IT assets. The messaging bus in the ESB connects enterprise services together. An ESB may be an event-driven and standards-based messaging engine that provides services for complex architectures. The ESB provides infrastructure that links together services and clients to enable distributed applications and processes. The ESB typically provides a service to a client using a service deployed on an ESB server at runtime. In an example, the ESB is deployed to an application server and then services are deployed to the ESB. The ESB allows systems to interact through standard transports, such as file transfer protocol (FTP) and hypertext transfer protocol (HTTP), and to provide SOA-based applications. The ESB provides the capabilities of message handling, filtering, data transformation, content-based routing, and message repositories.

BRIEF SUMMARY

This disclosure relates to one or more duplex services residing in a duplex messaging bus. Methods, systems, and techniques for integrating a plurality of heterogeneous peer-to-peer communication participants using the duplex messaging bus are provided.

According to an embodiment, a method of integrating a plurality of heterogeneous peer-to-peer communication participants includes retrieving from a first input queue coupled to a duplex service a first message. The first message includes a message identifier and is from a sender. The method also includes applying at the duplex service a first operation on the first message. The method further includes determining a first output of the first message based on the first operation. The method also includes sending the first output of the first message to a target. The method further includes retrieving from a second input queue coupled to the duplex service a second message. The second message includes the message identifier and is from a target. The method also includes applying at the duplex service a second operation on the second message. The method further includes determining a second output of the second message based on the second operation. The method also includes sending the second output of the second message to a sender of the first message.

According to another embodiment, a system for integrating a plurality of heterogeneous peer-to-peer communication participants includes a duplex service residing in a messaging bus. The system also includes a first input queue coupled to the duplex service. The duplex service retrieves a first message from the first input queue and applies a first operation on the first message. The first message is from a sender and includes a message identifier. The system further includes a second input queue coupled to the duplex service. The duplex service retrieves a second message from the second input queue and applies a second operation on the second message. The second message is from a target and includes the message identifier.

According to another embodiment, a non-transitory machine-readable medium includes a plurality of machine-readable instructions that when executed by one or more processors are adapted to cause the one or more processors to perform a method including: retrieving from a first input queue coupled to a duplex service a first message, the first message including a message identifier and being from a sender; applying at the duplex service a first operation on the first message; determining a first output of the first message based on the first operation; sending the first output of the first message to a target; retrieving from a second input queue coupled to the duplex service a second message, the second message including the message identifier and being from a target; applying at the duplex service a second operation on the second message; and determining a second output of the second message based on the second operation; and sending the second output of the second message to a sender of the first message.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architectures
   A. Duplex Messaging Bus and Duplex Services
   B. Heterogeneous Communication Participants
   C. Duplex Service Coupled to a Plurality of Input Queues
   D. Heterogeneous Peer-to-Peer Communication
      1. First Communication Participant Sends Request Message to Second Communication Participant
      2. Second Communication Participant Sends Response Message to First Communication Participant
      3. Preserve State From Request Message
III. Fixed Configuration Pipeline
V. Example Method
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An SOA architecture is based on a client-server communication schema and thus does not typically allow mutual peer-to-peer communication. In an example, an ESB may use an SOA architecture to provide the capabilities of message handling, filtering, data transformation, content-based routing, and message repositories. The ESB may be used for client-server interactions and may provide infrastructure that links together services and clients to enable distributed applications and processes. The ESB may include one or more messaging busses that logically interconnect available services and clients. Each ESB application is typically coupled to one gateway (e.g., an HTTP gateway, JMS gateway, or FTP gateway, etc.) that accepts incoming requests and converts them into internal messages understood by a service residing in the ESB. An internal message is a message that is understood by one or more services residing in the ESB, and enterprise services communicate with each other using internal ESB messages. Accordingly, an ESB may be a good solution when one needs to create a service from reusable components and expose it to a client via any possible gateway.

A pipeline may be configured such that the output of a service in the pipeline is sent as an input to the next service in the pipeline. The execution of services residing in the ESB is typically sequential according to their position on the messaging bus. In a conventional ESB, a message that is passed to a service flows in only one direction. In an example, a first communication participant may communicate with a second communication participant by invoking one or more services of the ESB. A communication participant may be a client that sends a request that is processed by one or more services residing in the ESB. In such an example, the ESB may be coupled to a gateway that receives a message including a request from the first communication participant, converts the message into an internal message that is understood by the first service residing in the ESB, and places the internal message in an input queue of the first service in the pipeline.

The first service processes the internal message and places an output of the processed message in an input queue of the next service in the pipeline. Each service may perform some type of processing on the message until the last service in the pipeline processes the message and sends an output of the processed message to the second communication participant. If the second communication participant desires to communicate with the first communication participant, however, the second communication participant typically is unable to invoke the services of the same ESB used by the first communication participant. Accordingly, it may be difficult to integrate two mutually interacting communication participants together. Thus in a typical scenario, the first and second communication participants are not peer-to-peer communication participants.

It may be desirable to enable peer-to-peer communication where each communication participant may initiate communication with the other communication participant. The present disclosure provides techniques to facilitate integration of a plurality of heterogeneous peer-to-peer communication participants. In addition, each participant may use its own application programming interface (API). An advantage of an embodiment of the invention may enable integration of a legacy system with a newly deployed system or creation of a cluster of heterogeneous servers. Conventional SOA architectures typically do not support this scenario. Additionally, an embodiment of the invention may enable quick creation of an integration layer from reusable components and integrate heterogeneous clusters.

In an embodiment, a method of integrating a plurality of heterogeneous peer-to-peer communication participants includes retrieving from a first input queue coupled to a duplex service a first message. The first message includes a message identifier and is from a sender. The method also includes applying at the duplex service a first operation on the first message, determining a first output of the first message based on the first operation, and sending the first output of the first message to a target. The method further includes retrieving from a second input queue coupled to the duplex service a second message. The second message includes the message identifier and is from a target. The method also includes applying at the duplex service a second operation on the second message, determining a second output of the second message based on the second operation, and sending the second output of the second message to a sender of the first message.

II. Example System Architectures

Figure 1:
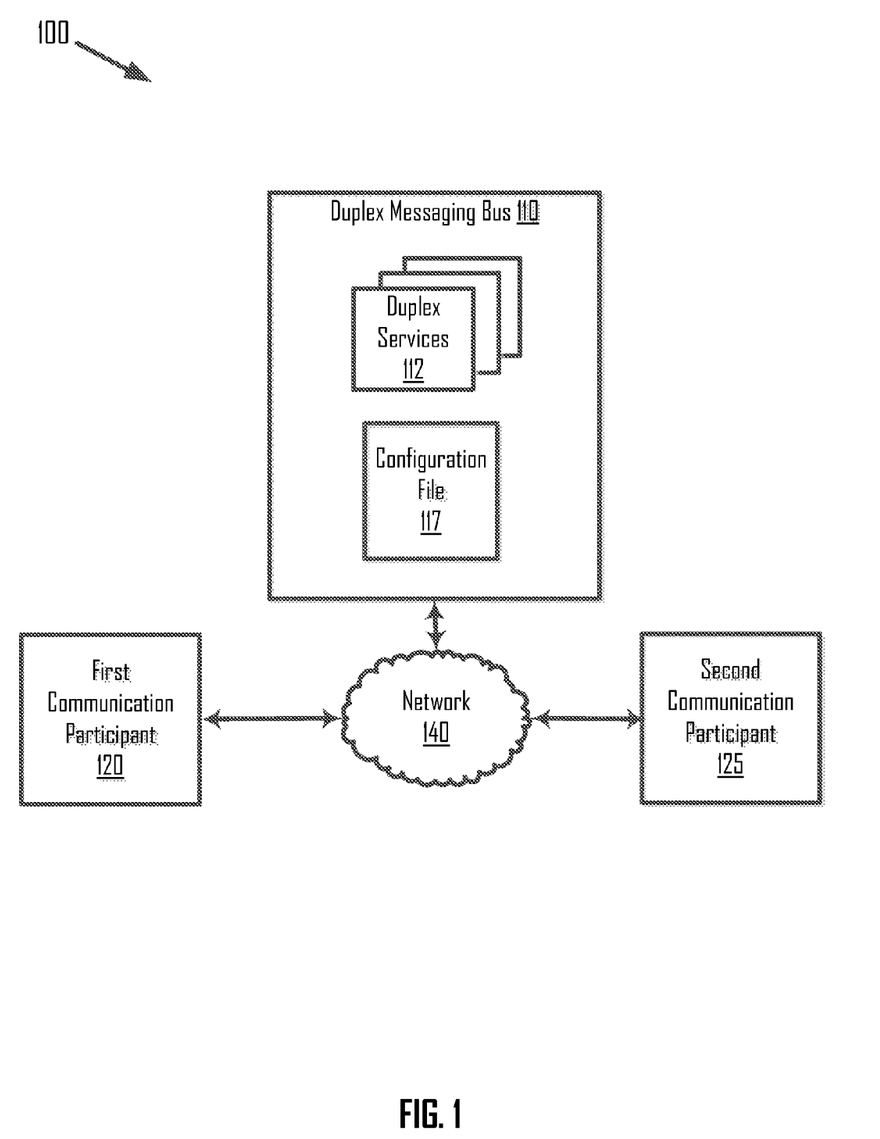
FIG. 1 is a block diagram illustrating a system for integrating a plurality of heterogeneous peer-to-peer communication participants, according to an embodiment.

FIG. 1 is a block diagram 100 illustrating a system for integrating a plurality of heterogeneous peer-to-peer communication participants, according to an embodiment. Diagram 100 includes a duplex messaging bus 110, a first communication participant 120, and a second communication participant 125 coupled over a network 140. First communication participant 120 and second communication participant 125 may be heterogeneous communication participants, and duplex messaging bus 110 may integrate first communication participant 120 and second communication participant 125 such that each communication participant may initiate communication with the other on a peer-to-peer level. A communication participant uses duplex messaging bus 110 and may be, for example, a service, information system, cache, an application, server, etc. Communication participants may communicate with each other through duplex messaging bus 110. In an example, communication participants communicate with each other only through duplex messaging bus 110.

Although two communication participants and one duplex messaging bus are illustrated, other embodiments including more than two communication participants and/or more than one duplex messaging bus are within the scope of the present disclosure. Network 140 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

A. Duplex Messaging Bus and Duplex Services

Duplex messaging bus 110 may allow software components to find and invoke each other irrespective of the technology used in their implementations. In an embodiment, duplex messaging bus 110 is an ESB. One or more duplex services 112 reside in duplex messaging bus 110 and may be deployed on a common server and/or different servers. In an embodiment, one or more communication participants (e.g., first communication participant 120 or second communication participant 125) and one or more duplex services 112 bind to duplex messaging bus 110 and perform interactions through duplex messaging bus 110. A duplex service 112 may be included in a product (e.g., duplex messaging bus 110) in a concrete implementation.

A duplex service may refer to a software component that is able to accomplish a task. The software component may be configurable. In an example, a duplex service may be configured to access one or more third-party services over network 140. For example, first communication participant 120 may send a message to duplex messaging bus 110 that invokes one or more duplex services 112 residing in duplex messaging bus 110. An invoked duplex service residing in duplex messaging bus 110 may call a third-party service to complete a task responsive to the message. In another example, a duplex service may be configured to store files onto a file system, write data to or read data from a database, access a file transfer protocol (FTP) server to download files, or send an e-mail.

Duplex messaging bus 110 also includes a configuration file 117. Configuration file 117 may define one or more services as being assigned to duplex messaging bus 110. An administrator may incorporate the assignment information into configuration file 117. In an example, configuration file 117 is an Extensible Markup Language (XML) file. When configuring an ESB application, an administrator may bind an input queue to an operation performed by a service and may also bind an output queue of a service to an input queue of another service. The table below provides an example of configuration file 117 containing binding information for three services and two gateways.

TABLE

```
<gateways>
<gateway name="http-gw" type="http" firstService="ciphering"
queue="inputQueueB" port=... outputDestination=...
/>
<gateway name="jms-gw" type="jms" firstService="ciphering2"
queue=... port=... outputDestination=...
/>
</gateways>
<services name=caching_synchronization>
<service name="ciphering" class="org.soa.esb.Encryption">
<operation name="cipherOP"
inputQueue="inputQueueA">
nextInputQeue="http-gw"
/>
<operation name="decipherOP"
inputQueue="inputQueueB">
nextInputQeue="inputQueueA"
/>
</service>
```

TABLE-continued

```
<service name="transformation" class="org.soa.esb.Transformation">
<operation name="JsonToXml"
inputQueue="inputQueueA">
nextInputQeue="inputQueueA"
/>
<operation name="XmlToJson"
inputQueue="inputQueueB">
nextInputQeue="inputQueueA"
/>
</service>
<service name="ciphering2" class="org.soa.esb.Encryption">
.....
</services>
```

Figure 2:
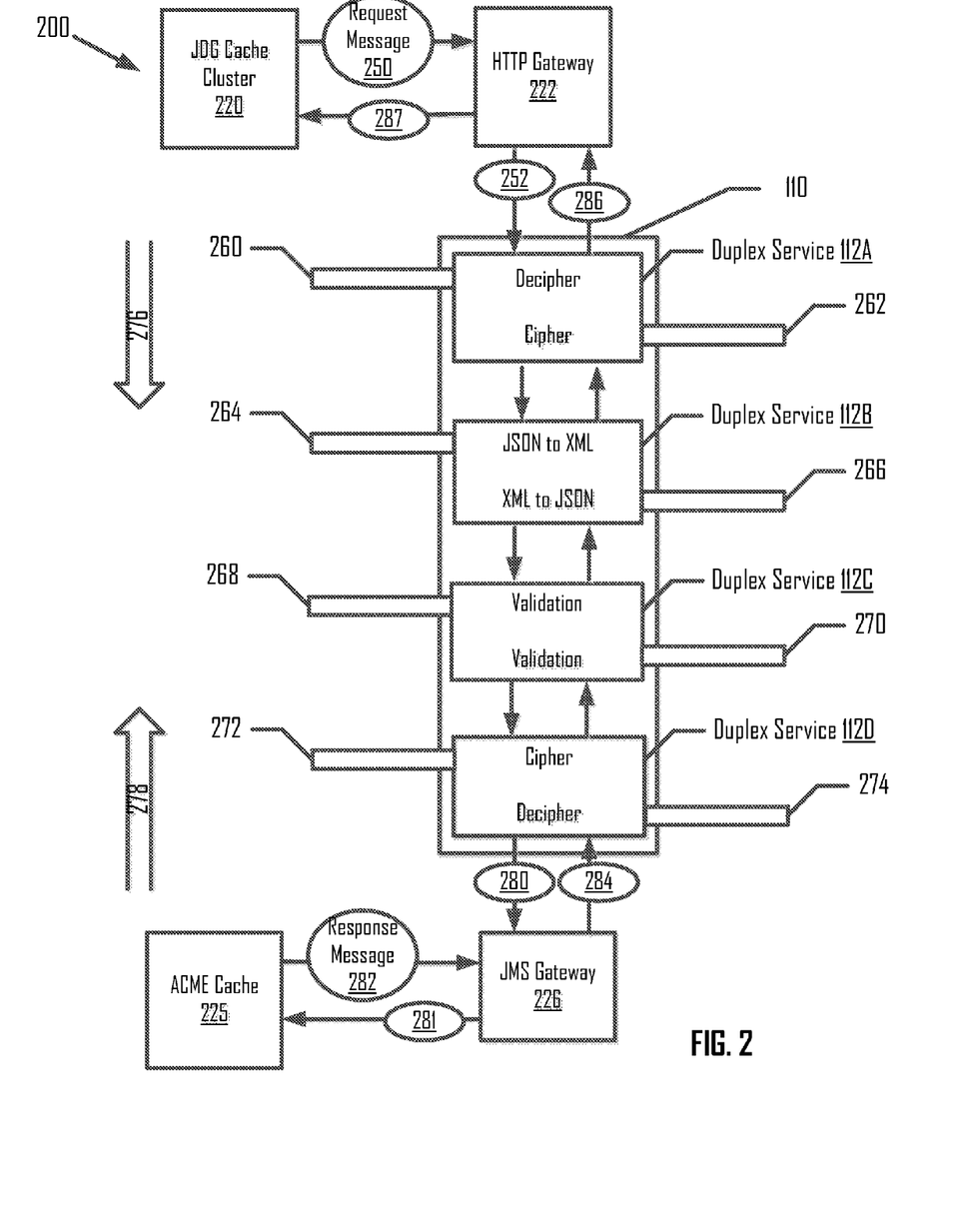
FIG. 2 is a block diagram illustrating a duplex messaging bus including a plurality of duplex services, according to an embodiment.

FIG. 2 is a block diagram 200 illustrating duplex messaging bus 110 including duplex services 112A-112D, according to an embodiment. Although four duplex services are illustrated as residing in duplex messaging bus 110, other embodiments including fewer than or more than four duplex services are within the scope of the present disclosure. Duplex service 112A is coupled to a first input queue 260 and a second input queue 262, duplex service 112B is coupled to a first input queue 264 and a second input queue 266, duplex service 112C is coupled to a first input queue 268 and a second input queue 270, and duplex service 112D is coupled to a first input queue 272 and a second input queue 274.

Duplex message bus 110 is coupled to a plurality of gateways that may each accept and send messages. In the example illustrated in FIG. 2, duplex messaging bus 110 is coupled to an HTTP gateway 222 and a JMS® gateway 226. Each gateway may have a configuration file that indicates a name of the respective gateway, a type of protocol (e.g., HTTP, FTP, and JMS®) accepted by the respective gateway, a port on which the respective gateway listens, an output destination to where to send one or more messages received from a first internal duplex service residing in duplex messaging bus 110, and a second internal duplex service residing in duplex messaging bus 110 to where to send one or more messages from external users. In an example, the output destination is not used for responses. Other parameters may be configured on the gateway.

B. Heterogeneous Communication Participants

In FIG. 2, a JBoss® Data Grid (JDG) cache cluster 220 and ACME cache 225 may be heterogeneous communication participants. For example, JDG cache cluster 220 and ACME cache 225 may have different interfaces. JDG cache cluster 220 is a distributed cache cluster, and each JDG cache in JDG cache cluster 220 may communicate with other JDG caches and synchronize data. ACME cache 225 may be used at ACME company, which uses an ACME application server that is capable of only using ACME cache 225.

Duplex messaging bus 110 may enable ACME cache 225 to be "added" to JDG cache cluster 220. For example, duplex messaging bus 110 may enable ACME cache 225 to communicate and synchronize data with all caches in JDG cache cluster 220. In FIG. 2, JDG cache cluster 220 and ACME cache 225 are communication participants that may initiate communication with each other. In an example, JDG cache cluster 220 may synchronize data with ACME 225 and initiate the synchronization. In another example, ACME cache 225 may synchronize data with JDG cache cluster 220 and initiate the synchronization. As indicated by the arrows to and from duplex services residing in duplex messaging bus 110, messages may flow bi-directionally as further described below. For example, messages may flow from JDG cache cluster 220 in a direction 276 to ACME cache 225 or may flow from ACME cache 225 in a direction 278 to JDG cache cluster 220.

C. Duplex Service Coupled to a Plurality of Input Queues

Figure 3:
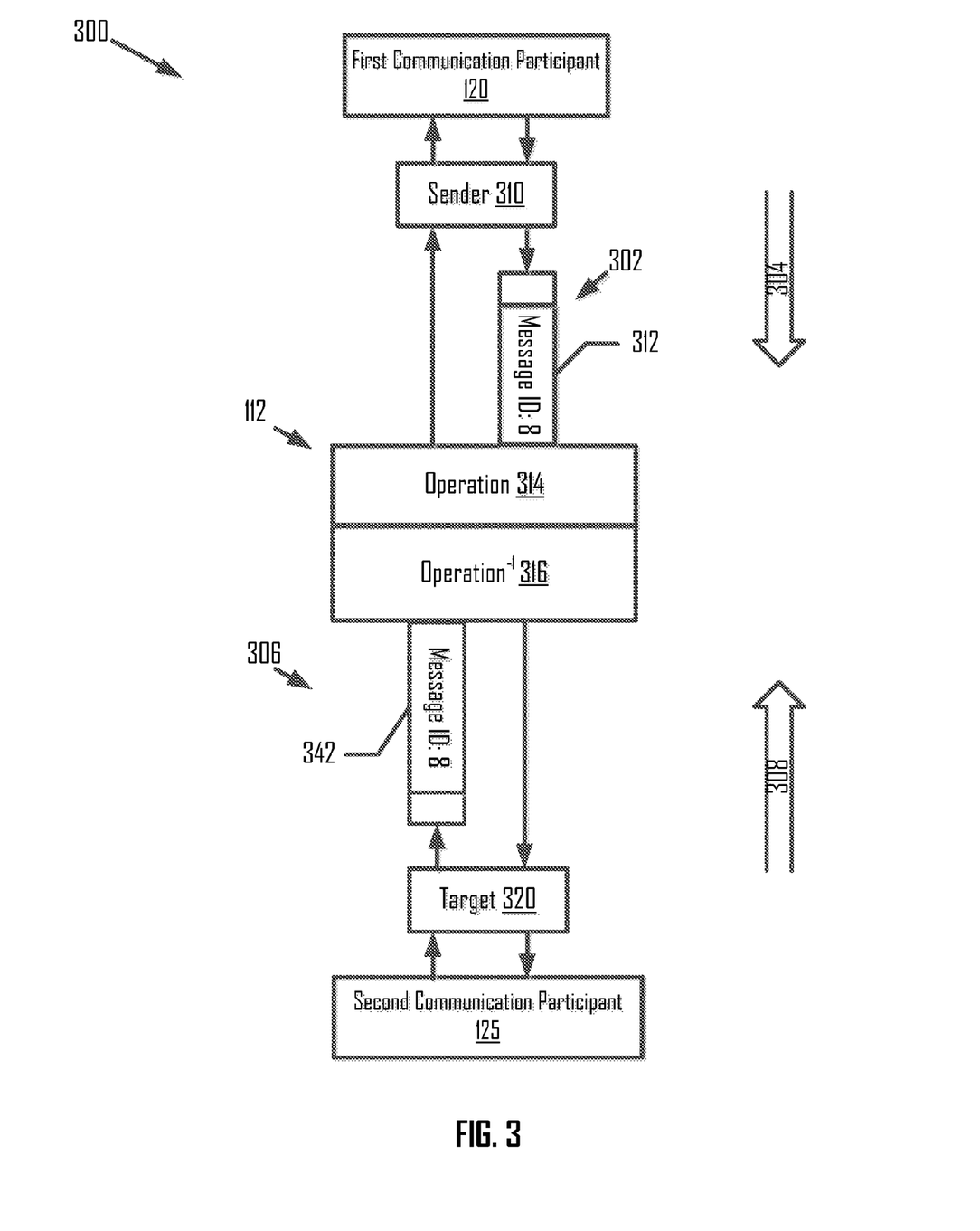
FIG. 3 is a block diagram illustrating a duplex service residing in the duplex messaging bus, according to an embodiment.

In an embodiment, a duplex service 112 has a plurality of input queues, and each input queue is associated with an operation. FIG. 3 is a block diagram 300 illustrating duplex service 112 residing in duplex messaging bus 110, according to an embodiment. Duplex service 112 is coupled to a first input queue 302 that stores one or more messages based on a communication from first communication participant 120. When first communication participant 120 initiates the communication, the messages may flow from first communication participant 120 in a first direction 304 to second communication participant 125. Duplex service 112 is also coupled to a second input queue 306 that stores one or more messages based on a communication from second communication participant 125. The flow of messages from second communication participant 125 to first communication participant 120 is in a direction 308. When second communication participant 125 initiates the communication, the messages may flow from second communication participant 125 in second direction 308 to first communication participant 120. First direction 304 is different from second direction 308. In an example, first communication participant 120 sends a request message to second communication participant 125, and second communication participant 125 sends a response message that is responsive to the request message. The request message and response message may be matched based on a message identifier included in the messages.

A sender 310 may place a message 312 including a message identifier into first input queue 302. Each message may have a unique identifier that identifies the message. The message identifier in message 312 is "8" and may uniquely identify the message. In an example, sender 310 may be a gateway or another duplex service residing in duplex messaging bus 110. Duplex service 112 includes a first execution engine that retrieves one or more messages from first input queue 302, applies an operation 314 on the one or more messages retrieved from first input queue 302, and determines an output of the one or more messages based on operation 314. In an example, the first execution engine applies operation 314 on message 312 and sends the output of processed message 312 to a target 320. In an example, target 320 may be a gateway or another duplex service residing in duplex messaging bus 110.

Duplex service 112 includes a second execution engine that retrieves one or more messages from second input queue 306 and applies an operation 316 on the one or more messages retrieved from second input queue 306. Accordingly, duplex service 112 may perform different operations on messages depending on which input queue the messages are retrieved from. Target 320 may place a message 342 including a message identifier into second input queue 306. The second execution engine determines an output of the one or more messages based on operation 316. In an example, the second execution engine applies operation 316 on message 342 and sends the output of processed message 342 to sender 310.

The message identifier in messages 312 and 342 is "8" and may uniquely identify the message. In an example, duplex service 112 executes on a server, and the first execution engine may process message 312 by applying operation 314 on an object and save a state of the object in a memory coupled to the server. At a later point in time, the second execution engine may retrieve message 342 from second input queue 306, identify the message identifier in message 342, and pair message 342 with message 312. In such an example, message 342 may be a response to message 312 sent from first communication participant 120. The second execution engine may retrieve the state of the object from the memory and use the retrieved state to apply operation 316 on the object. Accordingly, a duplex service may store a state of a message in memory and it may be unnecessary to pass all of the state in the message. This may reduce data passed over a network.

Further, in the example illustrated in FIG. 3, operation 314 is an inverse operation of operation 316. In such an example, operations 314 and 316 may be two mutually inverse operations (e.g., cipher/decipher or add prefix/remove prefix). This is not intended to be limiting, however, and other embodiments in which operation 314 is the same operation as operation 316 are also within the scope of the disclosure. In such an example, a duplex service may apply the same operation for both input queues (e.g., validation/validation or logging information/logging information).

D. Heterogeneous Peer-to-Peer Communication

Referring back to the example illustrated in FIG. 2, JDG cache cluster 220 is able to communicate through HTTP, accepts HTTP messages, and understands data in the JavaScript Object Notation (JSON) format. JDG cache cluster 220 is coupled to an HTTP gateway 222 and communicates with HTTP gateway 222. In an example, when JDG cache cluster 220 initiates communication with ACME cache 225, JDG cache cluster 220 sends a request message 250 to HTTP gateway 222, which places an internal message in first input queue 260, and messages flow from JDG cache cluster 220 in first direction 276 to ACME cache 225.

In contrast to JDG cache cluster 220, AMCE cache 225 is able to communicate through Java Message Service® (JMS), accepts JMS messages, and understands data in the Extensible Markup Language (XML) format. ACME cache 225 is coupled to a JMS gateway 226 and communicates with JMS gateway 226. In an example, when ACME cache 225 initiates communication with JDG cache cluster 220, ACME cache 225 sends a message to JMS gateway 226, which places an internal message in second input queue 274, and messages flow from ACME cache 225 in second direction 278 to JDG cache cluster 220.

1. First Communication Participants Sends Request Message to Second Communication Participant Duplex messaging bus 110 is coupled to HTTP gateway 222 and JMS® gateway 226. In an example, when JDG cache cluster 220 desires to communicate with ACME cache 225 (e.g., to determine whether particular data are stored in ACME cache 225), JDG cache cluster 220 sends request message 250 to HTTP gateway 222. In such an example, request message 250 may be an HTTP request and may include information about data changes. HTTP gateway 222 receives request message 250, converts it into an internal message 252 understood by duplex service 112A, and places internal message 252 in first input queue 260. In an example, HTTP gateway 222 extracts a ciphered payload from request message 250 and puts it in internal message 252.

Duplex service 112A deciphers messages that are retrieved from first input queue 260 and ciphers messages that are retrieved from second input queue 262. In relation to FIG. 3, the decipher operation may refer to operation 314 and the cipher operation may refer to operation 316. Duplex service 112A may decipher the message payload in internal message 252 and send the deciphered message to duplex service 112B. In an example, duplex service 112A places the deciphered message in first input queue 264 coupled to duplex service 112B.

Duplex service 112B converts messages that are retrieved from first input queue 264 from JSON to XML format and converts messages that are retrieved from second input queue 266 from XML to JSON format. In relation to FIG. 3, the conversion from JSON to XML format may refer to operation 314 and the conversion from XML to JSON format may refer to operation 316. Duplex service 112B may convert the deciphered message from JSON to XML format and send the XML message to duplex service 112C. In an example, duplex service 112B places the XML message in first input queue 268 coupled to duplex service 112C.

Duplex service 112C validates messages that are retrieved from first input queue 268 and second input queue 270. In keeping with the above example, duplex service 112C retrieves the XML message from first input queue 268, validates the XML message, and sends the validated message to duplex service 112D. For example, duplex service 112C places the validated message in first input queue 272 coupled to duplex service 112D.

Duplex service 112D ciphers messages that are retrieved from first input queue 272 and deciphers messages that are retrieved from second input queue 274. In relation to FIG. 3, the cipher operation may refer to operation 314 and the decipher operation may refer to operation 316. Additionally, the cipher/decipher algorithm used by duplex service 112D may be different from or the same as the cipher/decipher algorithm used by duplex service 112A. Duplex service 112D may create a ciphered message 280 by ciphering the validated message retrieved from first input queue 272 and send ciphered message 280 to JMS gateway 226, which converts the internal message into a format that is understood by ACME cache 225. For example, JMS gateway 226 may convert ciphered message 280 into a JMS message 281 that is understood by ACME cache 225, and sends JMS message 281 to ACME cache 225.

2. Second Communication Participants Sends Response Message to First Communication Participant ACME cache 225 may respond to request message 250 via duplex messaging bus 110. If request message 250 from JDG cache cluster 220 is a request for data, ACME cache 225 may respond with the requested data. In an example, ACME cache 225 initiates a communication with JDG cache cluster 220 and sends a response message 282 to JMS gateway 226. In such an example, processing of message 282 flows from ACME cache 225 in direction 278 to JDG cache cluster 220, which is the "reverse" of direction 276.

In an example, JMS gateway 226 receives response message 282 and converts it into an internal message 284 that is understood by duplex service 112D. JMS gateway 226 places message 284 in second input queue 274 for processing by duplex service 112D. Duplex service 112D retrieves message 284 from second input queue 274, deciphers message 284, and places the deciphered message in second input queue 270 for processing by duplex service 112C. Duplex service 112C retrieves the deciphered message from second input queue 270, validates the deciphered message, and places the validated message in second input queue 266 for processing by duplex service 112B. The validated message is in XML format.

Duplex service 112B retrieves the validated message from second input queue 266, converts the validated message from XML to JSON format, and places the JSON formatted message in second input queue 262 for processing by duplex service 112A. Duplex service 112A retrieves the JSON formatted message from second input queue 262, ciphers the JSON formatted message, and sends ciphered message 286 to HTTP gateway 222. HTTP gateway 222 converts ciphered message 286 into a message 287 that is understood by JDG cache cluster 220. For example, HTTP gateway 222 converts message 286 into an HTTP message and sends the HTTP message to JDG cache cluster 220.

3. Preserve State from Request Message

A response message may be sent to a communication participant that sent a request message that matches with the response message. Response message 282 may be a response to request message 250. In an example, response message 282 is paired up with request message 250 because both messages include the same message identifier. As discussed, a gateway converts a message (e.g., HTTP message or JMS message) external to duplex message bus 110 into an internal format that is understood by one or more duplex services 112 residing in duplex messaging bus 110. In an embodiment, a gateway assigns a message identifier to each internal message that the gateway creates and includes the message identifier in the internal message. A gateway and service may use the message identifier to pair a request message and a response message.

In an example, JDG cache cluster 220 sends request message 250 to HTTP gateway 222, which creates internal message 252, assigns a message identifier to internal message 252, and includes the message identifier in message 252. Processing of message 252 may continue from service 112A, to service 112B, to service 112C, to service 112D, which applies an operation to the message and sends an output of the processed message to JMS gateway 226. When JMS gateway 226 eventually receives the output of processed request message 250, JMS gateway 226 converts the output into a JMS message 281 that is understood by ACME cache 225, and sends JMS message 281 to ACME cache 225.

JMS gateway 226 may wait for a response to request message 250 from ACME cache 225. JMS gateway 226 may receive response message 282, which is a message that is a response to request message 250, and assign response message 282 the same message identifier that was assigned to request message 250. JMS gateway 226 converts response message 282 into an internal message 284 that includes the message identifier. Processing of message 284 may continue from service 112D, to service 112C, to service 112B, to service 112A, which applies an operation to the message and sends an output of the processed message to HTTP gateway 222. When HTTP gateway 222 eventually receives the output of processed response message 282, HTTP gateway 222 converts the output into an HTTP message 287 that is understood by JDG cache cluster 220, and sends HTTP message 287 to JDG cache cluster 220. Duplex services and HTTP gateway 222 on the other side of the pipeline may pair the response message with the request message using the message identifier identified in the message.

Referring back to FIG. 3, duplex service 112 may apply operations 314 and 316 on the same object. In an embodiment, duplex service 112 stores object state of a request-response session. If the message identifier of messages is the same, the messages may be paired up and the state from one message may be used in processing the other message. Referring to the example configuration in the table above, the service "transformation" converts XML to JSON and vice versa and processes the request message using object "org.soa.esb.Transformation". When the request message is processed, duplex service 112 may preserve the object and wait for a response message that matches the previously processed request message. In an example, duplex service 112 may determine a state of an object in accordance with processing an internal request message, save the state of the object associated with the internal request message in a memory, and retrieve the saved state if an internal response message having the same message identifier as the internal request message is later received. In an example, duplex service 112 retrieves an internal response message including the message identifier of the internal request message, identifies the message identifier in the internal response message, and recognizes that it has the same message identifier as the previously processed internal request message. Duplex service 112 may retrieve, based on recognizing that the two messages have the same message identifier, the state of the object from the memory and use the retrieved state to process the internal response message (e.g., apply an operation on the object). In an example, attributes can be reused in the processing of the response message. Accordingly, it may be unnecessary to pass the state of a message in the message. This may reduce the amount of data that is passed over a network.

Further, an embodiment of the invention may improve security of the system. For example, a given duplex service may recognize that a message retrieved from an input queue contains sensitive information and cipher a portion of the message with a random cipher key. The given duplex service may execute on a secure server and generate and store the cipher key in a memory coupled to the secure server. Next, the given duplex service may send the partially ciphered message to another service in the pipeline for processing. Other services in the pipeline may work on the data in the message that are not sensitive. When the message comes back through the pipeline and is received at the given duplex service, it may use the cipher key to decipher the sensitive information. Thus, the communication participant that receives the deciphered message may be able to read the sensitive data in the message while preventing other services in the pipeline from understanding the sensitive data. In an example, the services residing in duplex messaging bus 110 do not share state information. In such an example, the cipher key is not visible to any of the other services.

For each message, duplex service 112 may store the state of an object until a response to the request is received or until a time period elapses. Duplex service 112 may mark the memory storing the state of the object for deletion. In an example, after duplex service processes the matched response message duplex service 112 marks the memory storing the state of the object for deletion. In another example, after a time period has elapsed, duplex service 112 marks the memory storing the state of the object for deletion.

As discussed above and further emphasized here, FIGS. 1-3 are merely examples, which should not unduly limit the scope of the claims. For example, although a duplex service is illustrated as being coupled to two input queues, this is not intended to be limiting and a duplex service may be coupled to more than two input queues.

IV. Fixed Configuration Pipeline

Additionally, in the example illustrated in FIG. 2, the duplex services process messages in a different order according to the direction flow of the message (e.g., direction 276 or direction 278). For example, when a message flows according to direction 276, the message may be deciphered, converted from JSON to XML format, validated, and then ciphered. In contrast, when a message flows according to direction 278, the message may be deciphered, validated, converted from XML to JSON format, and then ciphered. Processing a message in a different order according to the direction flow of the message may be advantageous because it may always be in the same state when it reaches a duplex service. For example, when a message is processed by duplex service 112C, which validates messages, the message retrieved from an input queue will be in XML format, which facilitates service implementation.

Figure 4:
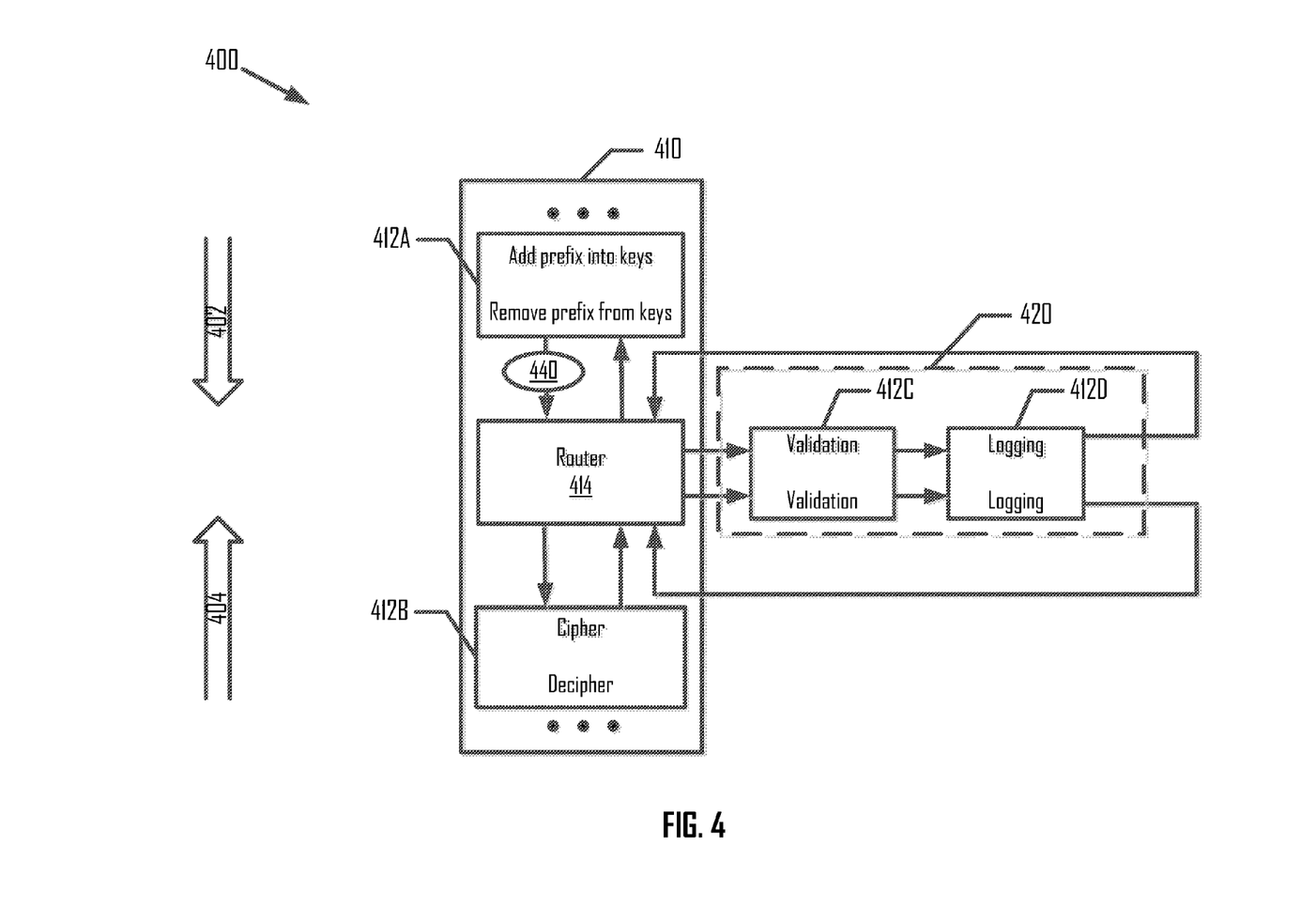
FIG. 4 is a block diagram illustrating a duplex service that processes a message in the same order in both directions, according to an embodiment.

In another example, it may be advantageous for a duplex service to process a message in the same order in both directions. FIG. 4 is a block diagram 400 illustrating a duplex service that processes a message in the same order in both directions, according to an embodiment. Diagram 400 includes a duplex messaging bus 410 including a duplex service 412A that applies a first operation of adding a prefix into keys to messages retrieved from a first input queue and applies a second operation of removing a prefix from keys to messages retrieved from a second input queue. Duplex messaging bus 410 also includes a duplex service 412B that applies a first operation of ciphering messages retrieved from a first input queue and applies a second operation of deciphering messages retrieved from a second input queue. The flow of messages is indicated by the arrows illustrated in duplex messaging bus 410.

Duplex messaging bus 410 also includes a router 414 that receives messages from duplex service 412A and/or duplex service 412B. When router 414 receives a message 440 from duplex service 412A, router 414 sends message 440 to a configured service pipeline 420 including a plurality of services. The services in service pipeline 420 are executed according to their sequential order in the pipeline. Service pipeline 420 includes a duplex service 412C that validates messages retrieved from an input queue and also includes a duplex service 412D that logs messages retrieved from an input queue.

Service pipeline 420 is a fixed configuration pipeline that may be used when a developer desires a set of services to be invoked in the same order from both directions. In FIG. 4, duplex services 412C and 412D are configured in service pipeline 420. Duplex service 112C may receive message 440, process it, and send an output of the processed message to duplex service 112D. Duplex service 112D receives the message, processes it, and sends an output of the processed message to router 414. Router 414 receives the output of the processed message 440 from duplex service 412D and sends the output to duplex service 412B, which is the next service in the original pipeline, to be ciphered. Although message 440 is described as being sent from duplex service 412A, other examples may involve duplex service 412B sending a message to router 414.

In an example, duplex service 412B processes a message and sends an output of the message to router 414. Router 414 receives the message and sends it to service pipeline 420 for processing. Router 414 may receive an output of the message from service pipeline 420 and send the output to duplex service 412A. Router 414 may receive messages from and send messages to a target and/or sender of a message.

V. Example Method

Figure 5:
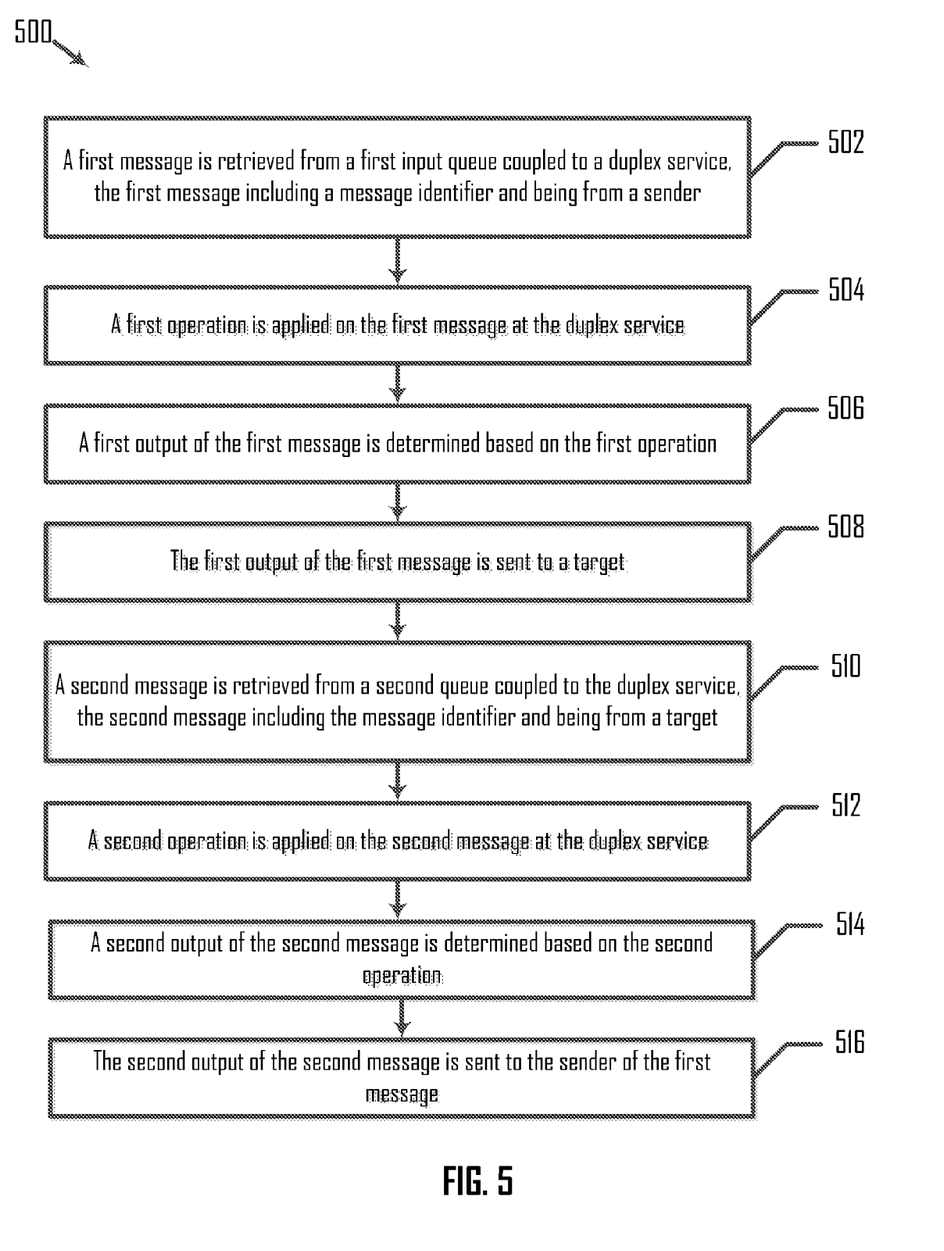
FIG. 5 is a flowchart illustrating a method of processing messages using a duplex messaging bus, according to an embodiment.

FIG. 5 is a flowchart illustrating a method 500 of integrating a plurality of heterogeneous peer-to-peer communication participants, according to an embodiment. Method 500 is not meant to be limiting and may be used in other applications.

Method 500 includes blocks 502-516. In a block 502, a first message is retrieved from a first input queue coupled to a duplex service, the first message including a message identifier and being from a sender. In an example, duplex service 112A retrieves from first input queue 260 coupled to duplex service 112A a first message, the first message including a message identifier "8" and being from HTTP gateway 222. In a block 504, a first operation is applied on the first message at the duplex service. In an example, duplex service 112A applies a first operation on the first message. In a block 506, a first output of the first message is determined based on the first operation. In an example, duplex service 112A determines a first output of the first message based on the first operation. In a block 508, the first output of the first message is sent to a target. In an example, duplex service 112A sends the first output of the first message to a target.

In a block 510, a second message is retrieved from a second input queue coupled to the duplex service, the second message including the message identifier and being from a target. In an example, duplex service 114A retrieves from second input queue 262 coupled to duplex service 112A a second message, the second message including the message identifier and being from a target. In a block 512, a second operation is applied on the second message at the duplex service. In an example, duplex service 112A applies a second operation on the second message. In a block 514, a second output of the second message is determined based on the second operation. In an example, duplex service 112A determines a second output of the second message based on the second operation. In a block 516, the second output of the second message is sent to the sender of the first message. In an example, duplex service 112A sends the second output of the second message to the sender of the first message.

It is also understood that additional processes may be inserted before, during, or after blocks 502-516 discussed above. It is also understood that one or more of the blocks of method 400 described herein may be omitted, combined, or performed in a different sequence as desired.

VI. Example Computing System

Figure 6:
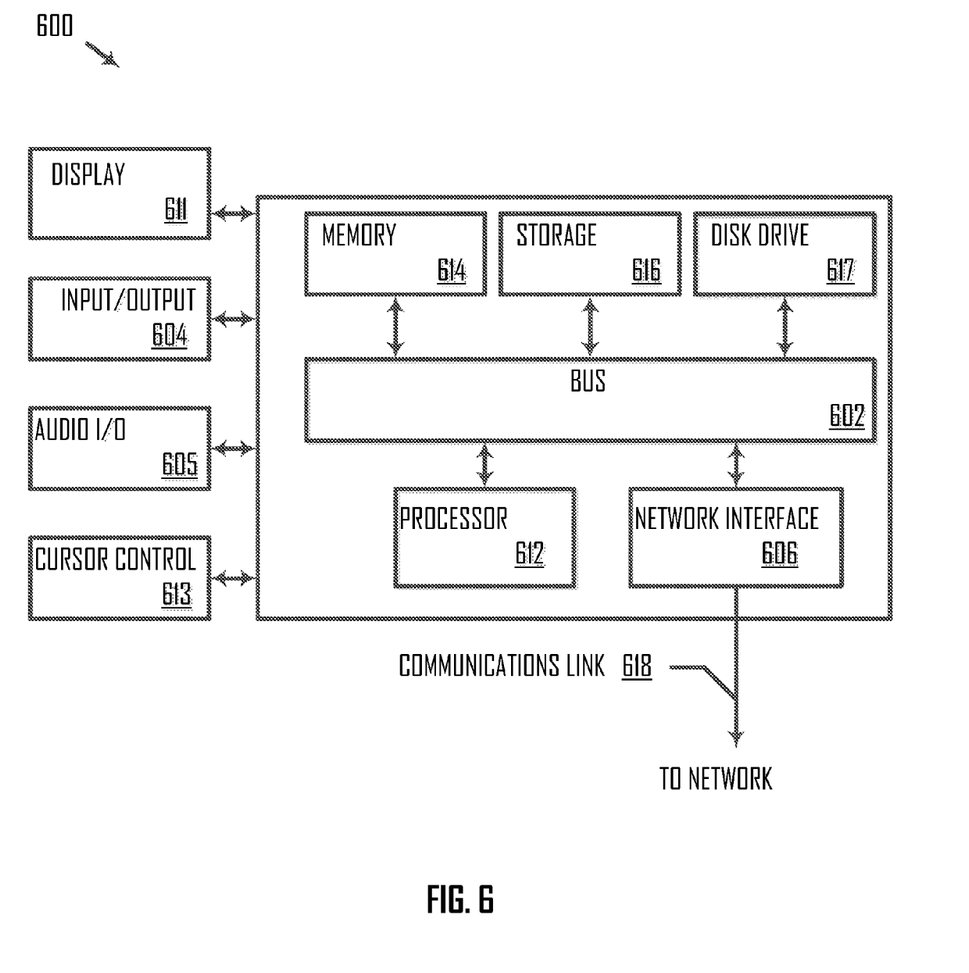
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, duplex messaging bus 110 may execute on a server computing device. In an example, each service residing in duplex messaging bus 110 may execute on a server computing device. The server computing device may include one or more processors. The server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure.

In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of integrating a plurality of heterogeneous peer-to-peer communication participants, comprising:
   retrieving a first message from a first input queue coupled to a duplex service, the first message including a first message identifier that identifies the first message and being from a sender, and the duplex service residing in a messaging bus;
   determining a state associated with the first message, the state based on applying a first operation on the first message;
   saving in a memory the state and an association between the state and the first message identifier;
   retrieving a second message from a second input queue coupled to the duplex service, the second message including a second message identifier;
   determining whether the first message identifier matches the second message identifier:
   in response to a determination that the first message identifier matches the second message, identifier:
      retrieving, the saved state associated with the first message identifier from the memory;
      applying, using the retrieved state, a second operation on the second message; and
      determining, at the duplex service, an output of the second message based on applying, using the retrieved state, the second operation on the second message, wherein if the first message identifier matches the second message identifier, a response to the first message is based on the output of the second message; and
   sending the output of the second message to the sender of the first message.

2. The method of claim 1, further comprising:
   applying the first operation on an object, wherein saving the state and the association includes saving a state of the object in the memory;
   retrieving the state of the object from the memory, wherein applying, using the state, the second operation includes using the retrieved state to apply the second operation on the object; and
   sending the output of the second message to the sender of the first message.

3. The method of claim 1, wherein the first operation is an inverse operation of the second operation.

4. The method of claim 1, wherein the first operation is the same operation as the second operation.

5. The method of claim 1, further comprising:
   in response to a determination that the first message identifier matches the second message identifier, determining that the first message is a request and that the second message is a response to the request.

6. The method of claim 1, wherein the message identifier is assigned to the first message.

7. The method of claim 1, further including:
   determining that the first message identifier matches the second message identifier.

8. A system for integrating a plurality of heterogeneous peer-to-peer communication participants, comprising:
   a duplex service residing in a messaging bus and coupled to a first input queue and a second queue,
   wherein the duplex service retrieves, by one or more processors, a first message from the first input queue, and saves in a memory a state associated with the first message and an association between the state and a first message identifier that identifies the first message, wherein the first message is from a sender to a target and includes the first message identifier, and the state is based on applying a first operation on the first message; and
   wherein the duplex service retrieves, by one or more processors, a second message from the second input queue and determines whether the first message identifier matches a second message identifier, wherein in response to a determination that the first message identifier matches the second message identifier, the duplex service: (i) retrieves the saved state associated with the first message identifier from the memory, (ii) applies, using the retrieved state, a second operation on the second message, and (iii) determines an output of the second message based on applying, using the retrieved state, the second operation on the second message, and wherein the duplex service sends the output of the second message to the sender of the first message, wherein if the first message identifier matches the second message identifier, a response to the first message is based on the output of the second message, and wherein the second message includes the second message identifier.

9. The system of claim 8, wherein the duplex service applies the first operation on an object and saves in the memory the state of the object.

10. The system of claim 9, wherein the duplex service identifies the message identifier in the second message and retrieves, based on the identification, the state of the object from the memory and uses the state to apply the second operation on the object.

11. The system of claim 8, wherein the messaging bus is coupled to a first gateway and a second gateway, and wherein each gateway has a configuration file that indicates a name of the respective gateway, a type of protocol accepted by the respective gateway, a port on which the respective gateway listens, an output destination to where to send one or more messages received from a first internal duplex service residing in the messaging bus, and a second internal duplex service to where to send one or more messages from external users.

12. The system of claim 8, wherein the sender is a first gateway coupled to the messaging bus, and the first gateway converts a received message from the sender into the first message understood by the duplex service.

13. The system of claim 8, wherein the sender is a second duplex service residing in the messaging bus, and wherein the first duplex service places the output of the second message in an input queue coupled to the second duplex service, and the second duplex service processes one or more messages from the input queue coupled to the second duplex service.

14. The system of claim 8, wherein the target is a gateway coupled to the messaging bus.

15. The system of claim 8, wherein the target is a second service residing in the messaging bus.

16. The system of claim 8, wherein the first operation is an inverse operation of the second operation.

17. The system of claim 8, wherein the sender and the target are heterogeneous peer-to-peer communication participants.

18. A non-transitory machine-readahle medium comprising a plurality of machine-readable instructions that when executed by one or more processors is adapted to cause the one or more processors to perform a method comprising:

retrieving a first message from a first input queue coupled to a duplex service, the first message including a first message identifier that identifies the first message and being from a. sender, and the duplex service residing in a messaging bus;

determining a state associated with the first message, the state based on applying a first operation on the first message;

saving in a memory the state and an association between the state and the first message identifier;

retrieving a second message from a second input queue coupled to the duplex service a, the second message including a second message identifier;

determining whether the first message identifier matches the second message identifier;

in response to a determination that the first message identifier matches the second message identifier:

retrieving., the saved state associated with the first message identifier from the memory;

applying, using the retrieved state, a second operation on the second message; and determining, at the duplex service, an output of the second message based on applying, using the retrieved state, the second operation on the second message, wherein if the first message identifier matches the second message identifier, a response to the first message is based on the output of the second message; and sending the output of the second message to the sender of the first message.

* * * * *